UNITED STATES PATENT OFFICE.

WILHELM HASENBACH, OF MANNHEIM, GERMANY.

PROCESS OF PRODUCING SODIUM HYDROSULFID.

No. 903,136.    Specification of Letters Patent.    Patented Nov. 3, 1908.

Original application filed November 1, 1907, Serial No. 400,207. Divided and this application filed March 10, 1908.
Serial No. 420,203.

*To all whom it may concern:*

Be it known that I, WILHELM HASENBACH, a subject of the German Emperor, and residing at Mannheim, Germany, have invented certain new and useful Improvements in Processes of Producing Sodium Hydrosulfid, of which the following is a specification.

This invention consists of a process of manufacturing solid pulverulent sodium-hydrosulfid free from water.

The process consists in passing sulfureted hydrogen free from oxygen (such for instance as has been obtained by the process which is the object of another application for U. S. Letters Patent filed of even date herewith, Serial No. 420,204) at a high temperature (preferably at a temperature of about 300° centigrade) over solid pulverulent sodium sulfid. The sulfureted hydrogen is thereby absorbed and a pulverulent hydrosulfid free from water is obtained. Sulfureted hydrogen is also taken up by solid pulverulent sodium sulfid at a lower temperature but it is not then possible to obtain a complete conversion of the solid pulverulent sodium-sulfid into hydrosulfid. If the temperature exceeds essentially 300° centigrade the reaction product melts.

If the sulfureted hydrogen used contains carbon dioxid the injurious action of this gas on the reaction product can be obviated by mixing the finely ground sodium sulfid with as much pulverulent caustic lime as corresponds to the amount of carbonic acid in the sulfureted hydrogen used. A dry, easily friable product is thus obtained which contains a high percentage of sodium-hydrosulfid free from water.

The product above described can in many cases be freed from its impurities, which chiefly consist of finely divided coal, at the place where it is to be used. As the product is obtained in a solid form it can be transported much more readily and cheaply than can the liquid products obtained by the processes heretofore commonly employed.

Having thus described the invention what is claimed is—

1. The herein described process of making solid pulverulent sodium - hydrosulfid free from water which consists in passing sulfureted hydrogen gas free from oxygen at a temperature of approximately 300° C. over finely pulverized anhydrous sodium sulfid.

2. The herein described process of making solid pulverulent sodium hydrosulfid free from water which consists in passing sulfureted hydrogen gas containing carbon dioxid at a temperature of approximately 300° C. over finely pulverized anhydrous sodium sulfid mixed with as much pulverized caustic lime as is required to combine with the carbon dioxid contained in the sulfureted hydrogen.

In testimony whereof I have signed my name to this specification in the presence of two subscribing witnesses.

WILHELM HASENBACH.

Witnesses:
 ALBERT SCHÛLE,
 JOS. H. LEUTE.